(12) United States Patent
Sellari et al.

(10) Patent No.: US 9,527,640 B2
(45) Date of Patent: Dec. 27, 2016

(54) METHODS OF MANUFACTURING TAMPER-RESISTANT AND TAMPER EVIDENT CONTAINERS

(71) Applicant: Inline Plastics Corp., Shelton, CT (US)

(72) Inventors: Robert Sellari, Huntington, CT (US); Peter Boback, Stratford, CT (US); Bruce Stein, Easton, CT (US); Daniel A. Landan, Oxford, CT (US); Tadeusz J. Klimaszewski, Hamden, CT (US)

(73) Assignee: Inline Plastics Corp., Shelton, CT (US)

( * ) Notice: Subject to any disclaimer, the term of this patent is extended or adjusted under 35 U.S.C. 154(b) by 347 days.

(21) Appl. No.: 14/310,965

(22) Filed: Jun. 20, 2014

(65) Prior Publication Data

US 2014/0300034 A1    Oct. 9, 2014

Related U.S. Application Data

(60) Continuation of application No. 13/044,776, filed on Mar. 10, 2011, now Pat. No. 8,795,580, which is a
(Continued)

(51) Int. Cl.
*B29C 51/00* (2006.01)
*B65D 55/02* (2006.01)
(Continued)

(52) U.S. Cl.
CPC ........... *B65D 55/024* (2013.01); *B29D 22/003* (2013.01); *B65D 41/32* (2013.01); *B65D 43/0254* (2013.01);
(Continued)

(58) Field of Classification Search
CPC ........ B29C 51/00; B29C 51/10; B29C 51/265; B29C 51/266
See application file for complete search history.

(56) References Cited

U.S. PATENT DOCUMENTS 646,563 A    4/1900   Bontrager et al.
2,798,631 A  7/1957   Engel
(Continued)

FOREIGN PATENT DOCUMENTS

CA    2074836 A1    6/1992
DE    78 16 353 U1  11/1978
(Continued)

OTHER PUBLICATIONS

Transmittal of the International Search Report for PCT/US2007/15739 together with the Written Opinion of the International Searching Authority (ISA) dated Sep. 10, 2008 (7 pages).
(Continued)

*Primary Examiner* — James Sanders
(74) *Attorney, Agent, or Firm* — Locke Lord LLP; Barry Kramer

(57) ABSTRACT

A method of thermoforming a tamper-resistant/tamper-evident container includes forming a cover portion that includes an outwardly extending peripheral flange, forming a base portion including an upper peripheral rim and a skirt depending downwardly therefrom. The upper peripheral rim is configured to communicate with at least a portion of the outwardly extending peripheral flange of the cover portion to hinder access to the container when the container is closed. Forming a hinge joining the cover portion and the base portion such that the vertical height of the hinge correlates with the height of the skirt that depends downwardly from the base portion when the height of the skirt is substantially uniform around the perimeter of the container and forming at least one line of weakness in the hinge, the line of weakness is severed to facilitate removal of the cover portion from the base portion to open the container.

6 Claims, 13 Drawing Sheets

Related U.S. Application Data division of application No. 11/483,900, filed on Jul. 10, 2006, now abandoned, which is a continuation-in-part of application No. 11/065,681, filed on Feb. 24, 2005, now Pat. No. 7,073,680, which is a continuation-in-part of application No. 10/895,687, filed on Jul. 21, 2004, now Pat. No. 7,118,003.

(60) Provisional application No. 60/489,093, filed on Jul. 21, 2003.

(51) Int. Cl.
| | |
|---|---|
| *B65D 43/02* | (2006.01) |
| *B65D 43/16* | (2006.01) |
| *B65D 41/32* | (2006.01) |
| *B29D 22/00* | (2006.01) |
| *B65D 43/22* | (2006.01) |

(52) U.S. Cl.
CPC .......... *B65D 43/162* (2013.01); *B65D 43/163* (2013.01); *B65D 43/22* (2013.01); *B65D 2543/0062* (2013.01); *B65D 2543/00092* (2013.01); *B65D 2543/00101* (2013.01); *B65D 2543/00296* (2013.01); *B65D 2543/00351* (2013.01); *B65D 2543/00509* (2013.01); *B65D 2543/00546* (2013.01); *B65D 2543/00685* (2013.01); *B65D 2543/00731* (2013.01); *B65D 2543/00796* (2013.01)

(56) References Cited

U.S. PATENT DOCUMENTS

| | | | |
|---|---|---|---|
| 2,915,214 | A | 12/1959 | Frankel |
| 3,164,478 | A | 1/1965 | Bostrom |
| 3,389,825 | A | 6/1968 | Whiteford |
| 3,511,433 | A | 5/1970 | Andrews |
| 3,536,251 | A | 10/1970 | Edwards |
| 3,669,606 | A | 6/1972 | Brown |
| 3,767,110 | A | 10/1973 | Congleton |
| 4,224,275 | A | 9/1980 | Sauer |
| 4,433,793 | A | 2/1984 | Ingemann |
| 4,535,889 | A | 8/1985 | Terauds |
| 4,555,043 | A | 11/1985 | Bernhardt |
| 4,576,330 | A | 3/1986 | Schepp |
| 4,576,370 | A | 3/1986 | Jackson |
| 4,742,935 | A | 5/1988 | Schellenberg |
| 4,771,934 | A | 9/1988 | Kalmanides |
| 4,886,204 | A | 12/1989 | Kalmanides |
| 4,986,438 | A | 1/1991 | Borst |
| 5,027,969 | A | 7/1991 | Lesquir |
| 5,040,695 | A | 8/1991 | Adams et al. |
| 5,046,659 | A | 9/1991 | Warburton |
| 5,052,574 | A | 10/1991 | McKinnon et al. |
| 5,092,479 | A | 3/1992 | Wells |
| D328,705 | S | 8/1992 | Krupa |
| 5,219,087 | A | 6/1993 | Christensson |
| 5,287,959 | A | 2/1994 | Hansen et al. |
| 5,303,839 | A | 4/1994 | Blumenschein |
| D352,000 | S | 11/1994 | Hansen et al. |
| 5,398,836 | A | 3/1995 | Luch et al. |
| 5,429,833 | A | 7/1995 | Wyslotsky |
| 5,507,406 | A | 4/1996 | Urciuoli et al. |
| 5,573,134 | A | 11/1996 | Chenault et al. |
| 5,584,408 | A | 12/1996 | Orkisz |
| 5,685,444 | A | 11/1997 | Valley |
| 5,758,791 | A | 6/1998 | Mangla |
| 5,860,530 | A | 1/1999 | Simmons et al. |
| 5,860,549 | A | 1/1999 | Allers et al. |
| 5,897,011 | A | 4/1999 | Brilliant et al. |
| 5,931,332 | A | 8/1999 | Mygatt et al. |
| 5,938,068 | A | 8/1999 | Atkins et al. |
| 5,979,687 | A | 11/1999 | Hayes et al. |
| 5,985,079 | A | 11/1999 | Ellison |
| 6,095,324 | A | 8/2000 | Mullin |
| 6,196,408 | B1 | 3/2001 | Setty et al. |
| 6,220,529 | B1 | 4/2001 | Xu |
| 6,517,242 | B1 | 2/2003 | Buchman |
| 6,530,870 | B2 | 3/2003 | Buchman et al. |
| 6,572,909 | B2 | 6/2003 | Bagwell et al. |
| 6,609,623 | B2 | 8/2003 | Chou |
| 6,625,955 | B2 | 9/2003 | Aylward |
| 6,715,632 | B2 | 4/2004 | Baker |
| 7,073,680 | B2 | 7/2006 | Boback et al. |
| 8,240,505 | B1 | 8/2012 | Chen |
| 8,261,933 | B2 | 9/2012 | Kidd et al. |
| 8,640,914 | B2 | 2/2014 | Meyer et al. |
| 8,684,212 | B2 | 4/2014 | Stone et al. |
| 8,795,580 | B2 | 8/2014 | Sellari et al. |
| 8,925,755 | B2 | 1/2015 | Lesquir et al. |
| 9,242,769 | B2 | 1/2016 | Gartz et al. |
| 9,278,786 | B2 | 3/2016 | Vovan et al. |
| 2003/0051350 | A1 | 3/2003 | Harrold |
| 2003/0052125 | A1 | 3/2003 | Hayes et al. |
| 2003/0052133 | A1 | 3/2003 | Hayes et al. |
| 2005/0017007 | A1 | 1/2005 | Sellari et al. |
| 2006/0289541 | A1 | 12/2006 | Boback et al. |
| 2007/0045317 | A1 | 3/2007 | Rosender et al. |
| 2009/0120937 | A1 | 5/2009 | Vovan |
| 2009/0134180 | A1 | 5/2009 | Kidd et al. |
| 2009/0206082 | A1 | 8/2009 | Vovan |
| 2010/0072217 | A1 | 3/2010 | Parikh et al. |
| 2010/0276422 | A1 | 11/2010 | Vovan et al. |
| 2011/0000929 | A1 | 1/2011 | Brown et al. |
| 2012/0005994 | A1 | 1/2012 | Tidball et al. |
| 2012/0103990 | A1 | 5/2012 | McCumber |
| 2013/0020325 | A1 | 1/2013 | Stone et al. |
| 2013/0160406 | A1 | 6/2013 | Johnston |
| 2013/0320015 | A1 | 12/2013 | Dyble et al. |
| 2014/0041343 | A1 | 2/2014 | Corbett et al. |
| 2014/0069922 | A1 | 3/2014 | Boback et al. |
| 2014/0138383 | A1 | 5/2014 | Lisowy et al. |
| 2014/0367383 | A1 | 12/2014 | Sellari et al. |
| 2015/0028033 | A1 | 1/2015 | Samuel |
| 2015/0060455 | A1 | 3/2015 | Chou |
| 2015/0083725 | A1 | 3/2015 | Sinha et al. |
| 2015/0225139 | A1 | 8/2015 | Baker |
| 2015/0266611 | A1 | 9/2015 | Dow et al. |
| 2015/0298853 | A1 | 10/2015 | Chen |
| 2015/0329249 | A1 | 11/2015 | Gingras et al. |
| 2015/0367987 | A1 | 12/2015 | Clark et al. |
| 2016/0016707 | A1 | 1/2016 | Sellari et al. |
| 2016/0023815 | A1 | 1/2016 | Siskindovich et al. |

FOREIGN PATENT DOCUMENTS

| | | |
|---|---|---|
| DE | 4418935 A1 | 12/1995 |
| DE | 1999-083197 | 8/1999 |
| EP | 0 752 374 A1 | 1/1997 |
| GB | 2219284 A | 12/1989 |
| GB | 2257118 A | 1/1993 |
| JP | 1-114536 U | 8/1989 |
| JP | 2-144531 U | 12/1990 |
| JP | 7-267275 A | 10/1995 |
| JP | 2002012283 | 1/2002 |
| WO | WO-9513222 A2 | 5/1995 |
| WO | WO-2005009857 A1 | 2/2005 |

OTHER PUBLICATIONS

Search Report and Written Opinion for PCT/2004/023473 dated Nov. 15, 2004.
European Communication for EP 04 778821.1 dated May 12, 2006.
European Communication for EP 04 778821.1 dated Jan. 25, 2007.
European Communication for EP 06003237.2 dated Feb. 13, 2008.
Extended European Search Report for EP 06003237.2 dated Jun. 7, 2006.
Russian Office Action dated Jun. 17, 2008 for RU 2006105207/12 (005627).
Russian Office Action dated Mar. 11, 2010 for RU 2006105515/12 (005971).

(56) References Cited

OTHER PUBLICATIONS

Translation of Ukrainian Office Action dated Oct. 5, 2009 for UA 2006 01701/1.
Translation of Ukrainian Office Action dated Sep. 3, 2008 for UA 2006 00913/M.
Canadian Office Action dated Jan. 30, 2013 for CA 2,533,236.
Canadian Office Action dated Aug. 20, 2010 for CA 2,533,046.
Canadian Office Action dated Jul. 14, 2011 for CA 2,533,046.
Canadian Protest dated Apr. 11, 2012 for CA 2,533,046 submitted by Bereskin & Parr LLP.
Canadian Office Action dated Oct. 31, 2012 for CA 2,533,046.
Canadian Protest dated Aug. 19, 2013 for CA 2,533,046 submitted by Bereskin & Parr LLP.
Chinese Office Action dated Jun. 27, 2008 for CN 200480024304.6.
Translation of Chinese Office Action for CN200610057668.5 dated Mar. 2009.
EasyPak, LLC's Motion for Leave to File Amended Invalidity Contentions dated Nov. 12, 2013.
Memo in Support of EasyPak, LLC's Motion for Leave to File Amended Invalidity Contentions dated Nov. 12, 2013.
Defendant's Reply in Support of Its Motion to File Amended Invalidity Contentions dated Dec. 6, 2013.
Plaintiff's Opposition to EasyPak's Motion for Leave to File Amended Invalidity Contentions dated Nov. 26, 2013.
Canadian Patent Ofice Office Action dated Feb. 5, 2014 issued in Canadian Patent Application No. 2,533,046.
CanadianProtest dated Oct. 7, 2014 filed by Bereskin & Parr in Canadian Application No. 2,533,046.
Canadian Office Action dated Apr. 15, 2015 issued in Canadian Patent application No. 2,533,046.
Canadian Office Action dated Apr. 1, 2016 issued in Canadian Application No. 2,533,046.

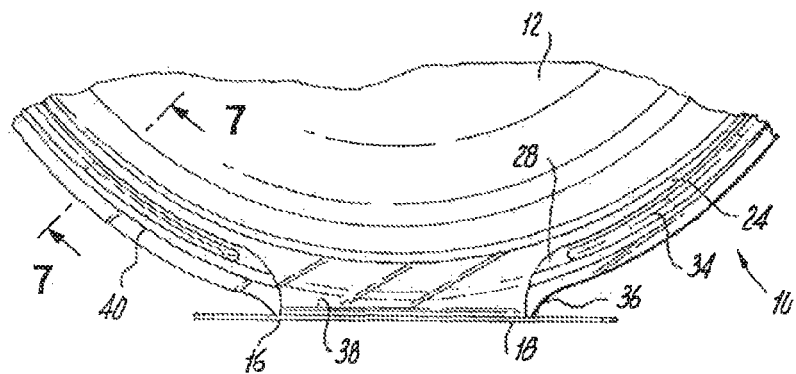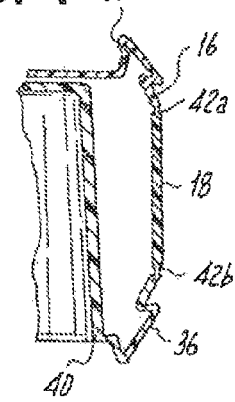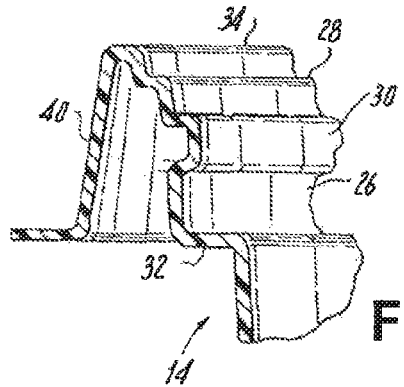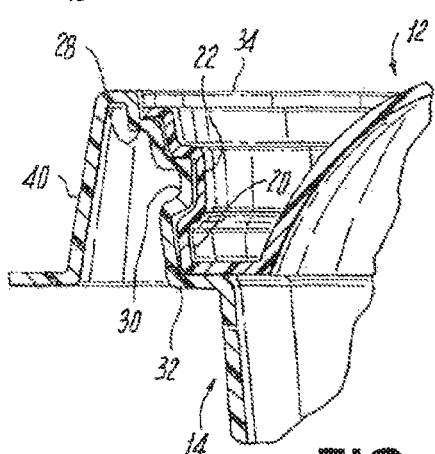

FIG. 10
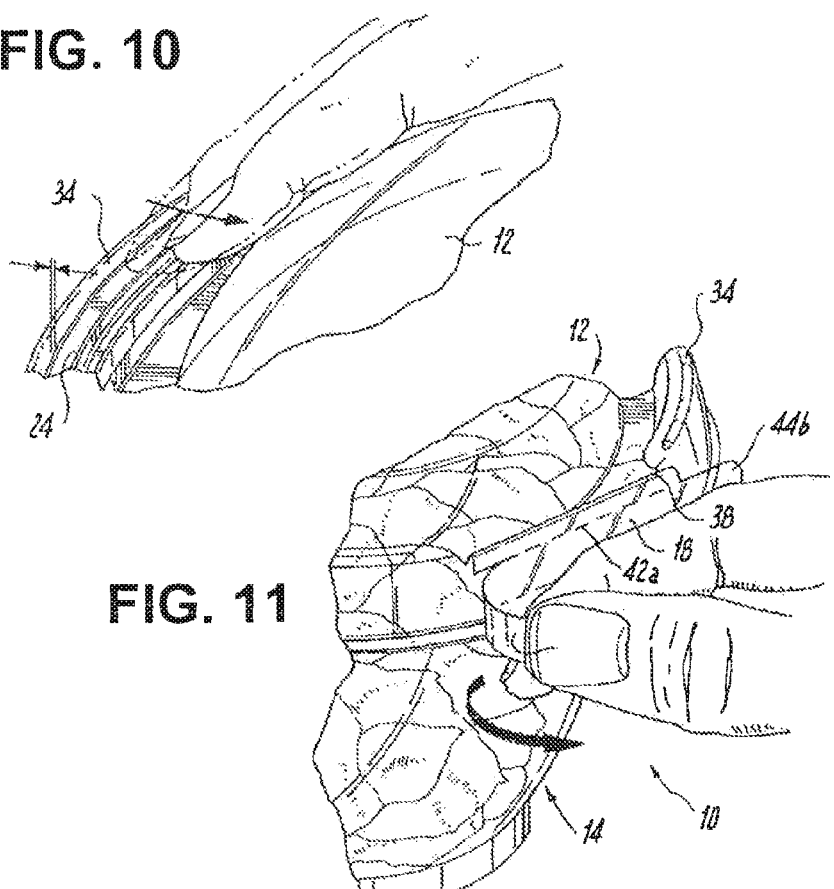
FIG. 11
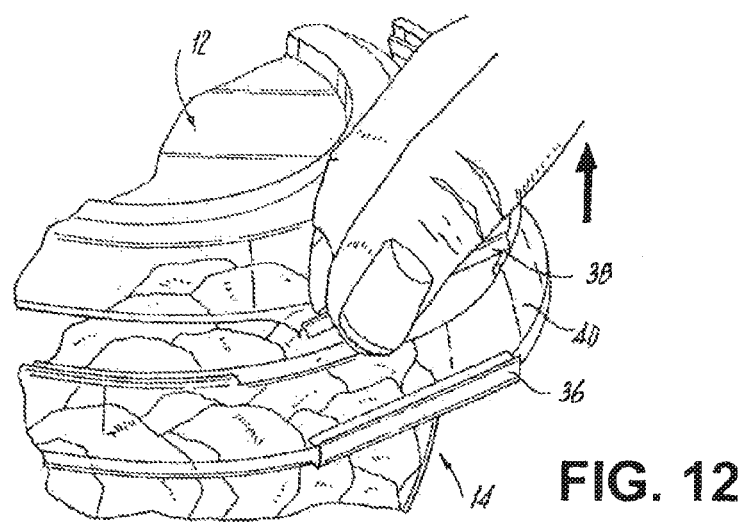
FIG. 12

METHODS OF MANUFACTURING TAMPER-RESISTANT AND TAMPER EVIDENT CONTAINERS

CROSS-REFERENCE TO RELATED APPLICATION(S)

The subject application is continuation of U.S. patent application Ser. No. 13/044,776, filed Mar. 10, 2011, which is a division of U.S. patent application Ser. No. 11/483,900 filed Jul. 10, 2006, which is a continuation in part of U.S. patent application Ser. No. 11/065,681, filed Feb. 24, 2005, now U.S. Pat. No. 7,073,680, which is a continuation in part of U.S. patent application Ser. No. 10/895,687 filed Jul. 21, 2004, now U.S. Pat. No. 7,118,003, which claims the benefit of priority to U.S. Provisional Patent Application Ser. No. 60/489,093 filed Jul. 21, 2003, the disclosure of each being incorporated by reference herein in its entirety.

BACKGROUND OF THE INVENTION

1. Field of the Invention

The subject invention is directed to containers and packaging, and more particularly, to containers and packaging that incorporate tamper-resistant and tamper-evident features.

2. Background of the Related Art

Disposable containers for packaging, distributing, displaying or otherwise housing consumer items, especially perishable foods, are becoming increasingly important. Historically, perishable products had to be brought to market and sold quickly before exposure to the atmosphere caused the products to lose their freshness.

The advent of plastics resulted in many products being wrapped or packaged in plastic, both in the form of flexible plastic bags and solid plastic containers. The use of plastics in the modern-day convenience food industry has significantly improved the "shelf life" of perishable products, allowing both merchants and their customers to store the products for longer periods of time, resulting in substantial savings.

It has been found that consumers like recloseable packages, particularly for comestible products, especially in circumstances where more than one serving of a comestible product is contained therein, in order to reduce drying out or other deterioration of the comestible food product. In addition, consumers prefer to visually inspect the food product within such containers prior to purchase. Thus, fabricating containers from clear see-through plastics is desirable. For example, packaging provided for bakery goods has often been in the form of clear, plastic clamshell packaging, because, among other things, such clear, plastic clamshell packaging, provides a baked-on-the-premises image which grocery retailers have found to be especially appealing to consumers.

Typically, plastic containers will include a fairly rigid lid and base, although they may be subject to some amount of flexure. The lid provided must be capable of properly and effectively sealing the container, yet the container must be constructed so that the lid is relatively easy to remove, and even replace, since it is expected that the container and lid would normally be reused.

In addition to the aforementioned consumer design preferences, it is desirable to fabricate containers that include features which either deter unauthorized tampering or clearly indicate whether unauthorized tampering has occurred, or both. These tamper-resistant/tamper-evident features typically include structural elements which, when the container is tampered with or opened without authorization, enable the consumer to easily visually recognize such tampering so that the product can then be rejected. Such tamper-resistant/tamper-evident elements are important for, among other things, deterring theft and preventing the loss of product and income for the seller, as well as instilling consumer confidence in the integrity of the contents within the container and confidence in the ability of the seller and/or manufacturer to provide and maintain quality goods.

Thus, there is a compelling interest in the development of containers having consumer-preferable design elements, such as recloseability features which are reliable and easy to operate, along with tamper-resistant/tamper-evident features that deter tampering and clearly indicate whether tampering has occurred, and which are also reliable without being burdensome to the legitimate consumer. Accordingly, the present invention is directed to a container that meets these needs.

SUMMARY OF THE DISCLOSURE

The present invention meets the aforementioned needs, while also improving upon and solving problems associated with previous containers by providing, among other things, a tamper-resistant container with tamper-evident features (also referred to herein as a "tamper-resistant/tamper-evident container") that includes a cover portion defining an outwardly extending peripheral flange and a base portion defining an upper peripheral edge. The upper peripheral edge of the base portion includes, at least in part, an upwardly projecting bead extending substantially about the perimeter of the base portion. This bead is configured and dimensioned to render the outwardly extending flange of the cover portion relatively inaccessible when the container is closed thereby providing a tamper-resistant container.

The container can further include a hinge joining the outwardly extending flange of the cover portion with the base portion. The hinge preferably includes a frangible portion, which upon severing, facilitates removal of the cover portion from the base portion.

In another embodiment, the container includes a skirt which depends downwardly from the upper peripheral edge of the base portion. Preferably, the hinge extends from the lower edge of the skirt to the outwardly extending flange of the cover portion.

These and other aspects of the present invention will become more readily apparent to those having ordinary skill in the art from the following detailed description of the invention taken in conjunction with the drawings.

BRIEF DESCRIPTION OF THE FIGURES

So that those having ordinary skill in the art to which the subject invention pertains will more readily understand how to make and use the tamper-resistant/tamper-evident evident package disclosed herein, embodiments thereof will be described in detail below with reference to the drawings, wherein:

FIG. 3 is a partial top view of the container shown in FIG. 1, illustrating in particular the hinge having a frangible section or strip and projection associated therewith that extends beyond the upwardly projecting bead associated with the upper peripheral surface of the base portion;

FIG. 4 is a partial cross sectional view of the container shown in FIG. 1, taken along line 4-4 of FIG. 2, illustrating in particular the hinge having a frangible section and upper and lower projections or arms extending from the cover portion and base portion of the container;

FIG. 5 is a partial cross sectional view of the container shown in FIG. 1, taken along line 5-5 of FIG. 8, illustrating in particular the configuration of the base portion and the structural elements that facilitate a releasable/recloseable engagement with the cover portion;

FIG. 6 is a partial cross sectional view of the container shown in FIG. 1, taken along line 6-6 of FIG. 8, illustrating in particular the configuration of the cover portion and the structural elements that facilitate a releasable/recloseable engagement with the base portion;

FIG. 7 is a partial cross sectional view of the container shown in FIG. 1, taken along line 7-7 of FIG. 3, illustrating in particular the configuration of the base portion and cover portion when the container is closed and including the structural elements that facilitate a releasable/recloseable engagement between the base and cover portions;

FIG. 10 is a partial perspective view of the container shown in FIG. 1, illustrating in particular the manner in which the upwardly projecting bead on the base portion physically prevents access to the outer edge of the cover portion, making it difficult to separate the cover portion from the base portion;

FIG. 11 is a partial perspective view of the container shown in FIG. 1, illustrating in particular the manner in which the frangible section can be removed from the hinge;

FIG. 12 is a partial perspective view of the container shown in FIG. 1, illustrating in particular the upper and lower projections formed by removal of the frangible section and the manner in which the upper and lower projections facilitate separation of the cover portion from the base portion;

FIG. 27 is a view of the interior of such an open container, and FIG. 28 is a view of the exterior of the container.

DETAILED DESCRIPTION OF THE PREFERRED EMBODIMENTS

Figure 1:
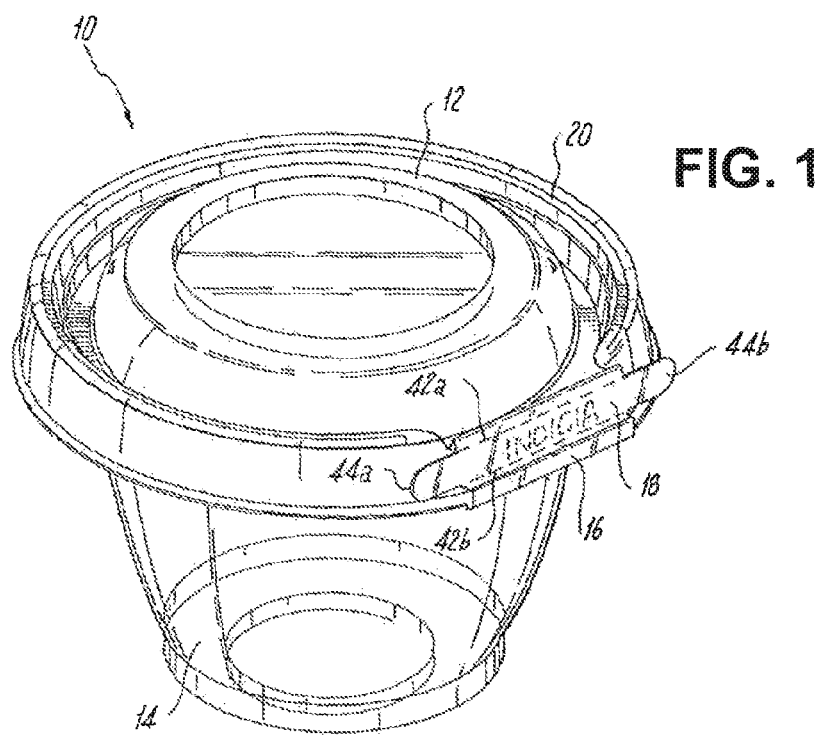
FIG. 1 is a perspective view of a tamper-resistant/tamper-evident evident container constructed in accordance with the present invention in an exemplary circular configuration having a base portion and cover portion connected to each other by a hinge having a frangible section.

The advantages of a tamper-resistant/tamper-evident evident container constructed in accordance with the present invention will become more readily apparent to those having ordinary skill in the art from the following detailed description of certain preferred and exemplary embodiments taken in conjunction with the drawings which set forth representative embodiments thereof, but are not intended to limit the scope of the present invention.

Unless otherwise apparent, or stated, directional references, such as "right," "left," "upper," "lower," "outward," "inward," etc., are intended to be relative to the orientation of a particular embodiment of the invention as shown in the first numbered view of that embodiment. In addition, a given reference numeral indicates the same or similar structure when it appears in different figures and like reference numerals identify similar structural elements and/or features of the subject invention.

Figure 2:
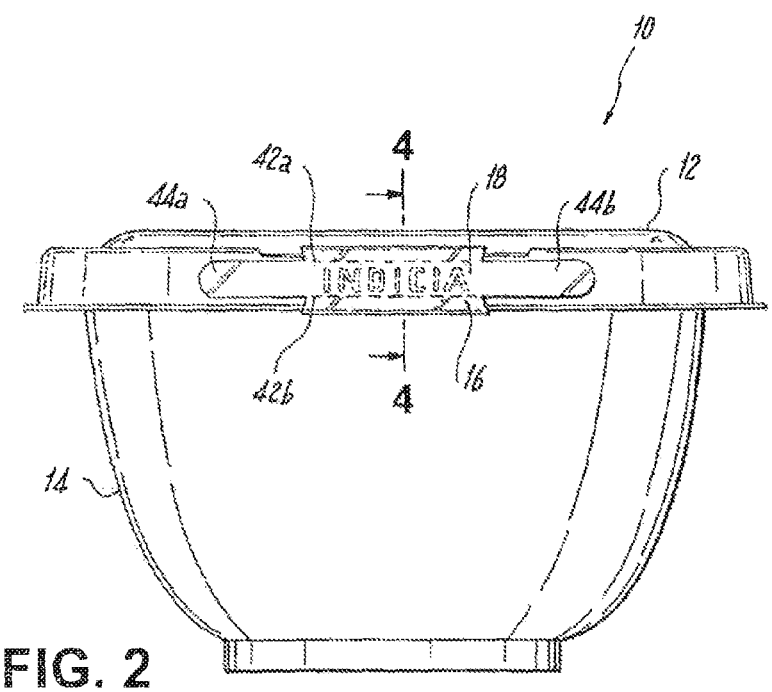
FIG. 2 is a side view of the container shown in FIG. 1, illustrating in particular the hinge having a frangible section or strip, and a suitable location for indicia to be printed thereon.
Figure 8:
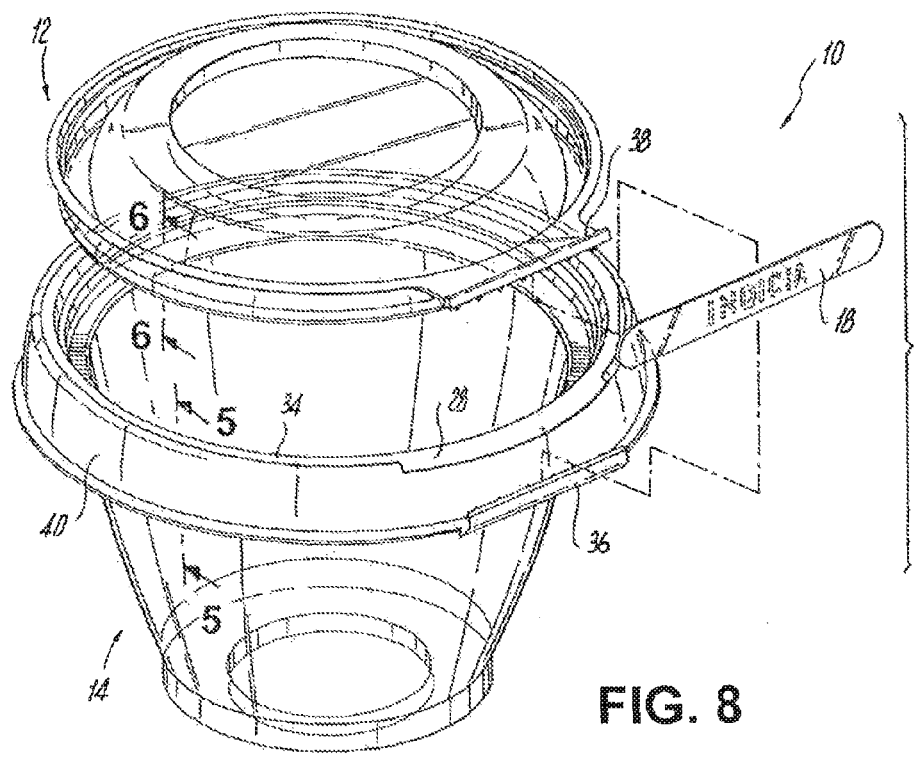
FIG. 8 is an exploded perspective view of the container shown in FIG. 1, illustrating in particular the operative association between the cover portion, base portion and frangible section.
Figure 9:
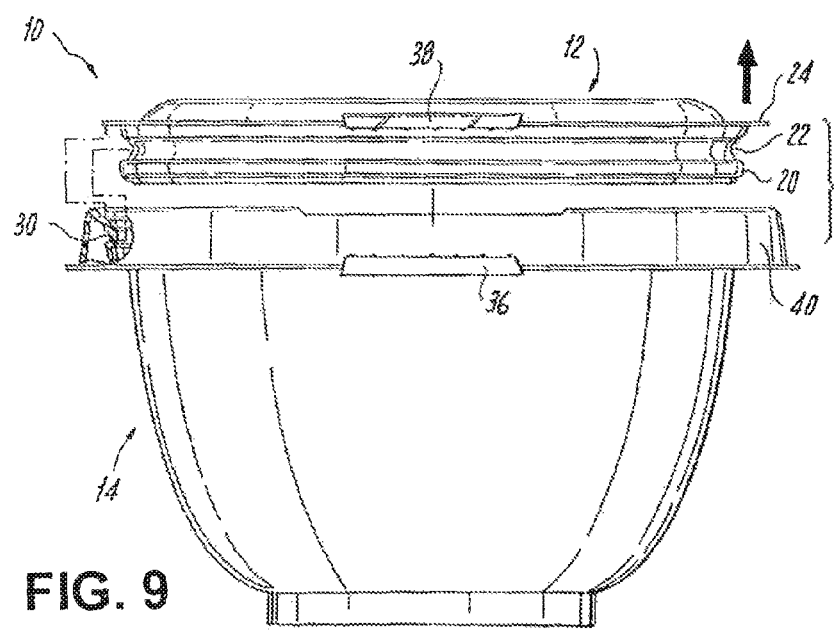
FIG. 9 is a side view of the container shown in FIG. 1, in which the frangible section has been removed, illustrating the manner in which the cover portion is separated from the base portion and the upper and lower projections or arms associated with the cover and base portions, respectively.

In accordance with an exemplary embodiment of the subject invention illustrated in FIGS. 1 and 2, the container 10 includes a generally circular cover portion 12 and a generally bowl-shaped base portion 14 joined together by a hinge 16. Hinge 16 includes a tamper-evident frangible section or pull strip 18, which, upon its removal, severs the integral connection between cover portion 12 and base portion 14.

In use, container 10 would be filled with the contents for which consumer protection is desired and cover portion 12 would be engaged with base portion 14. In accordance with the present invention, cover portion 12 and base portion 14 may include structural features that facilitate the formation of a non-permanent engagement between cover portion 12 to base portion 14.

In this embodiment, the non-permanent engagement between cover portion 12 and base portion 14 is facilitated by, among other things, a peripheral locking shoulder 20 and an radially inward circumferential groove 22 formed below an outwardly extending peripheral flange 24 on cover portion 12, which can be seated within a corresponding mating circumferential recess 26 on base portion 14. Circumferential recess 26 on base portion 14 is formed below an upper peripheral rim 28 and includes a radially inward projecting rib 30 and a radially inwardly extending rim 32.

When cover portion 12 is closed on base portion 14, projecting rib 30 mates with circumferential groove 22 on cover portion 12 and extending rim 32 mates with locking shoulder 20 on cover portion 12. In addition, outwardly extending peripheral flange 24 on cover portion 12 abuts upper peripheral rim 28 on base portion 14.

Container 10 incorporates features which are intended to prevent and deter opening container 10 without first removing frangible strip 18 from hinge 16. In this embodiment, container 10 includes an upwardly projecting bead 34 on base portion 14 that extends substantially about the perimeter of peripheral rim 28 and is positioned to surround the outer edge of flange 24 of cover portion 12 when container 10 is closed. The position and upward extension of bead 34 is configured to hinder the relatively easy method of removing a cover from conventional containers that may resemble or have characteristics in common with container 10. As can be best viewed in FIG. 10, bead 34 physically blocks access to the edge of peripheral flange 24 on cover portion 12 from fingers or any other object that might normally be used for leverage to pry cover portion 12 from base portion 14.

Hinge 16 includes an upper outwardly projecting arm 36 connected to base portion 14, and a similar lower outwardly projecting arm 38, which is connected to cover portion 12. In particular, upper arm 36 is connected with a skirt 40 that projects downward from upper peripheral rim 28 and radially outward with respect to base portion 14. Lower arm 38 is connected with the peripheral flange 24. Upper and lower arms 36 and 38 are joined together by a common attachment to frangible strip 18 to form hinge 16.

Preferably, frangible strip 18 is delimited at least in part by a pair of parallel score lines 42a, 42b or areas that have been weakened or stressed during the forming process. Frangible strip 18 may be further delimited by a plurality of spaced apart areas in which material has been removed associated with the score lines, by a plurality of spaced apart depressions associated with the score lines, or by perforation lines. The width and depth of the areas and/or depressions can vary to control the tear resistance offered by frangible strip 18. Alternatively, the integral hinge 16 could be formed with a single score line or perforation line, rather than a pair of score lines. In this instance, the single score line could be severed to create a pair of projections which would be used to open the container.

In this embodiment, strip 18 includes laterally opposed grasping tabs 44a and 44b to provide a convenient location for gripping strip 18. Preferably, instructional indicia is imprinted on strip 18 to facilitate its removal from hinge 16 and/or consumer understanding of the significance of its removal as it relates to product tampering. Strip 18 and/or the instructional indicia preferably thereon can be colored or embossed, or otherwise fabricated to direct attention thereto.

As can be best viewed in FIGS. 11 and 12, detaching frangible strip 18 from hinge 16 of container 10 leaves behind upper and lower arms 36 and 38 on cover portion 12 and base portion 14, respectively. Upper and lower arms 36 and 38 extend outwardly from container 10 and can be used to facilitate removal of cover portion 12 from base portion 14, once strip 18 has been removed, by applying sufficient opposing force to disengage locking shoulder 20 from within circumferential recess 26.

The presence of bead 34 prevents unauthorized access to the contents of container 10 by making it difficult to pull cover portion 12 from base portion 14. If access to container 10 is desired, strip 18 must be removed so that upper and lower arms 36 and 38 are free to be used to leverage cover portion 12 from base portion 14. Cover portion 12 may be replaced on base portion 14 after container 10 is opened. Strip 18, however, once removed, is not replaceable. Thus, removal of strip 18 functions as a clear indicator of possible tampering, in that if strip 18 is partially or fully removed prior to purchase, it is readily apparent to a consumer that someone may have already gained access to the contents of container 10.

Figure 13:
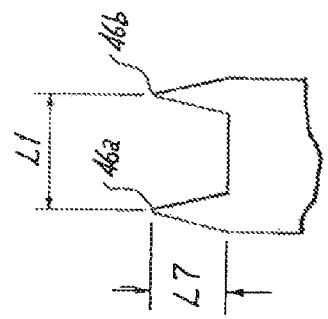
FIG. 13 is a side view of a two blade knife that can be used to form the frangible section of a container constructed in accordance with an embodiment of the present invention.
Figure 15:
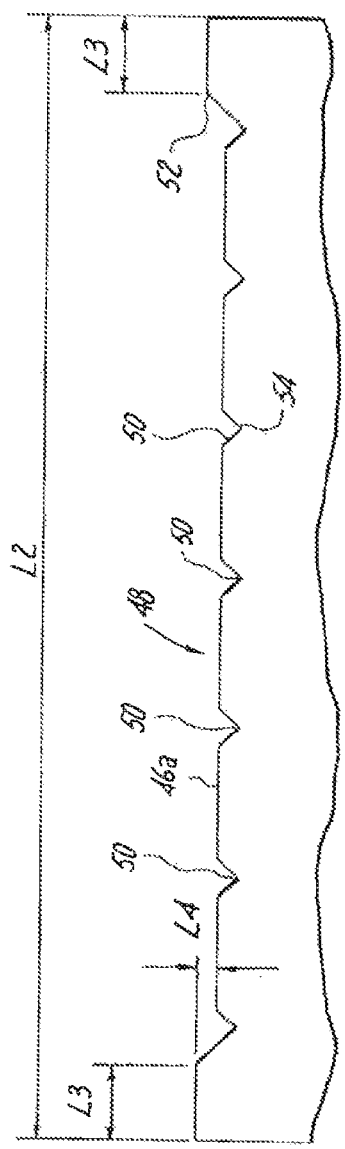
FIG. 15 is a front plan view of a second blade of the two blade knife of FIG. 13, illustrating the position of the nicks, cutting surfaces and offset that can form a second score line of a frangible section of a container constructed in accordance with an embodiment of with the present invention.
Figure 14:
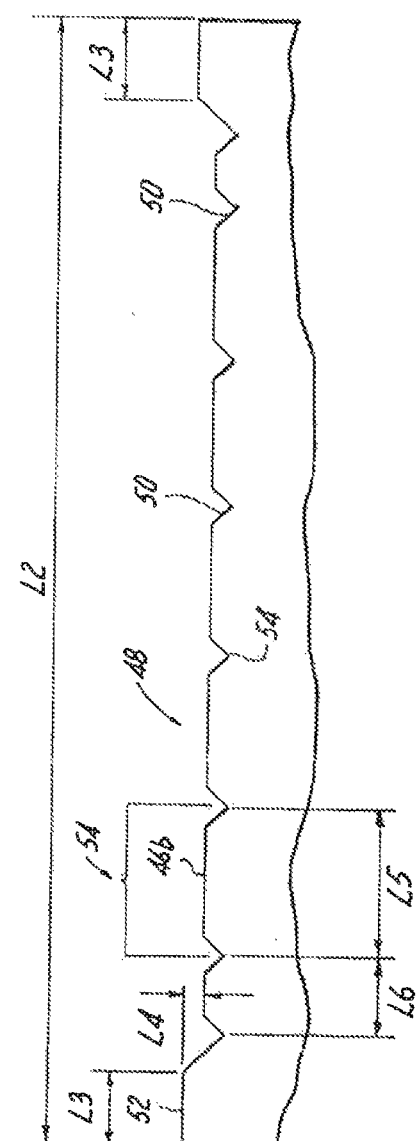
FIG. 14 is a front plan view of a first blade of the two blade knife of FIG. 13, illustrating the position of the nicks and cutting surfaces that can form a first score line of a frangible section of a container constructed in accordance with an embodiment of with the present invention.
Figure 16:
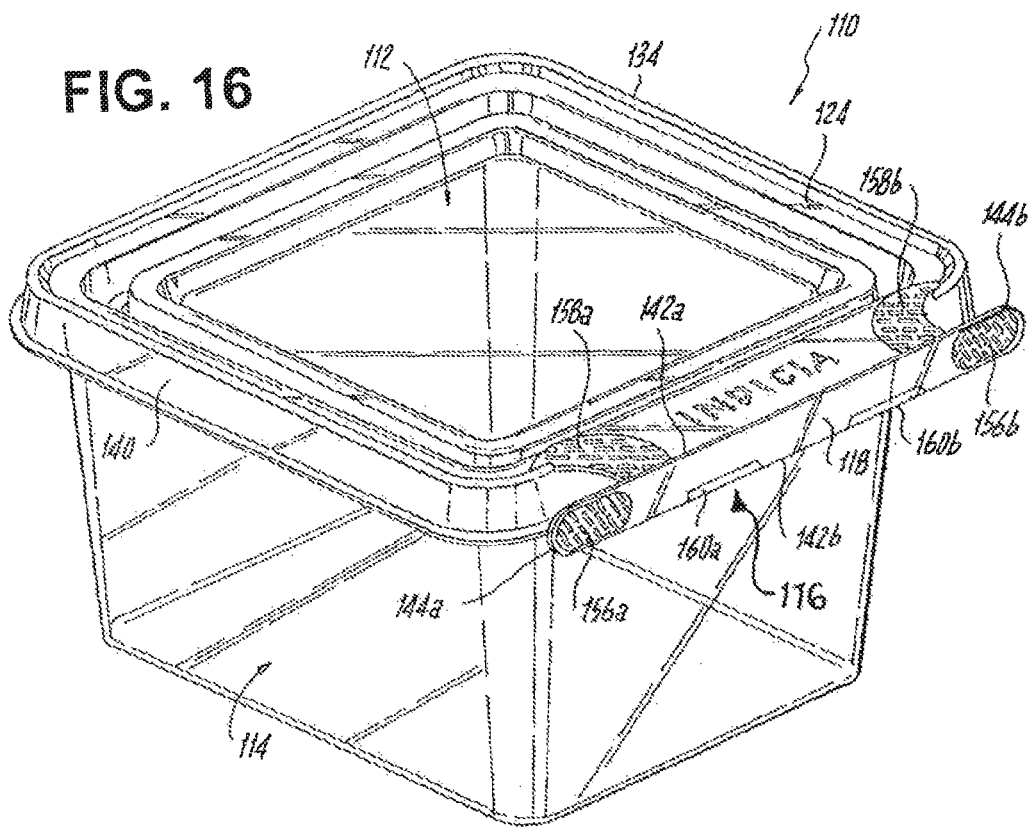
FIG. 16 is perspective view of a tamper-resistant/tamper-evident evident container constructed in accordance with the present invention in an exemplary rectangular configuration having a base portion and cover portion connected to each other by a hinge having a frangible section.
Figure 17:
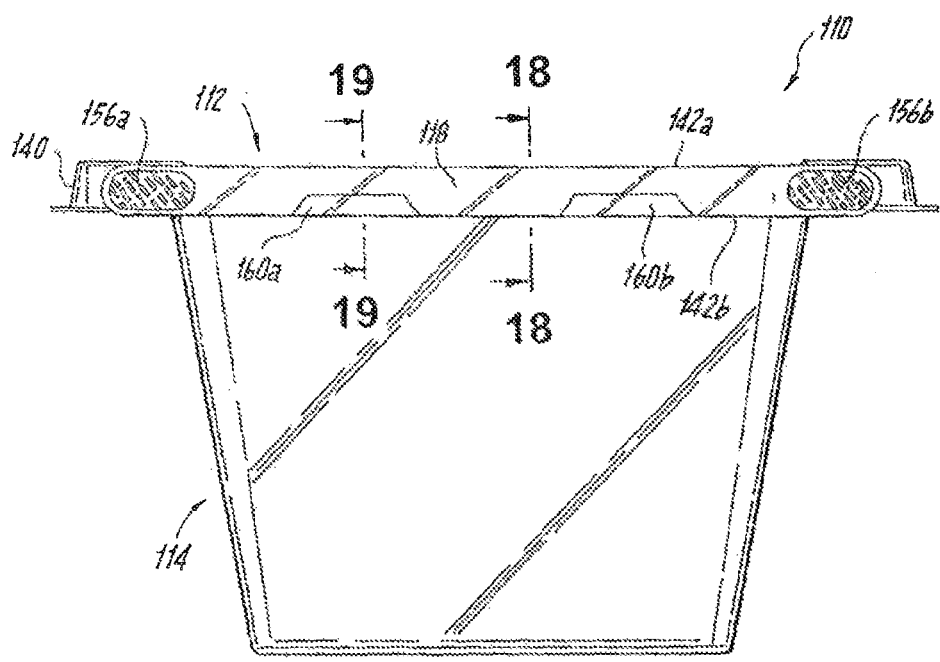
FIG. 17 is a side view of the container shown in FIG. 16, illustrating in particular the hinge having a frangible section or strip, patterned sections on opposing ends thereof, and tabs defined by the frangible section score line.
Figure 18:
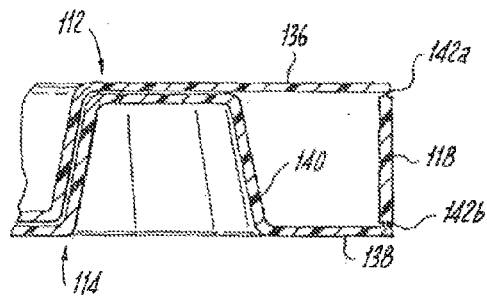
FIG. 18 is a partial cross sectional view of the container shown in FIG. 16, taken along line 18-18 of FIG. 17, illustrating in particular the configuration of the hinge, upper and lower projections and frangible section.
Figure 19:
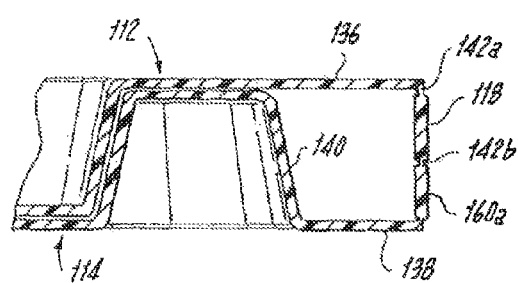
FIG. 19 is a partial cross sectional view of the container shown in FIG. 16, taken along line 19-19 of FIG. 17, illustrating in particular the configuration of the hinge, upper and lower projections, frangible section, and score line defining a tab associated with the lower projection.
Figure 20:
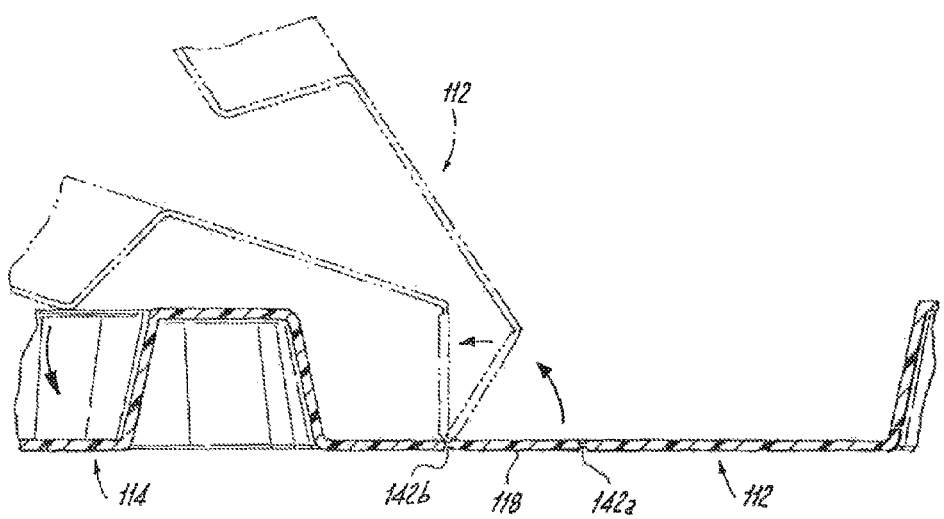
FIG. 20 is a partial cross sectional view of the container shown in FIG. 16, illustrating in particular the manner in which the cover portion is closed on the base portion.
Figure 21:
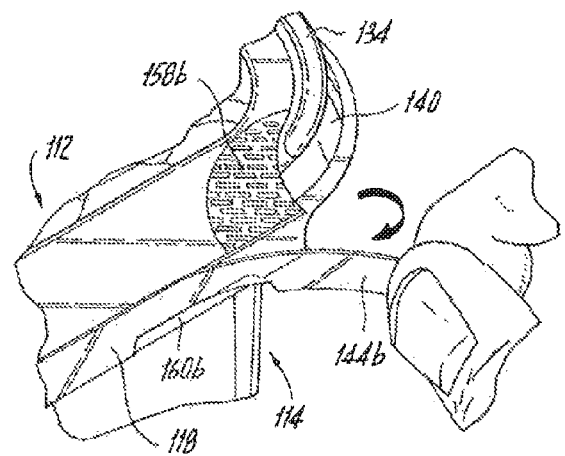
FIG. 21 is a partial perspective view of the container shown in FIG. 16, illustrating in particular the manner in which the frangible section is removed from the hinge.
Figure 22:
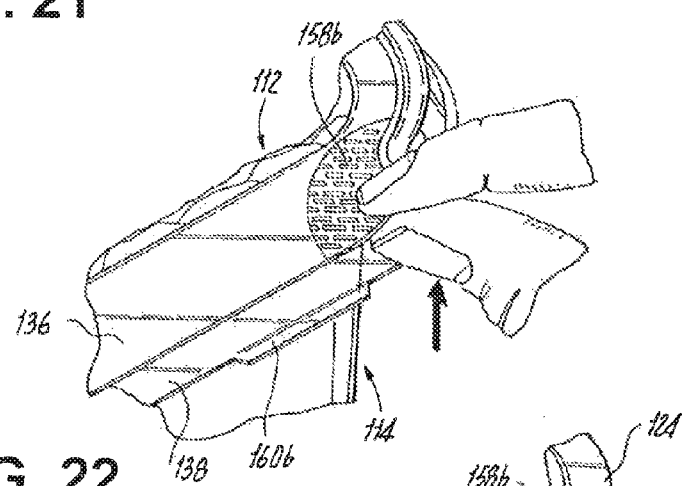
FIGS. 22-23 are partial perspective views of the container shown in FIG. 1, illustrating in particular the manner in which the separation of the cover portion from the base portion is facilitated by clasping the patterned section disposed on the upper projection or arm associated with the cover portion which is formed upon removal of the frangible section.
Figure 23:
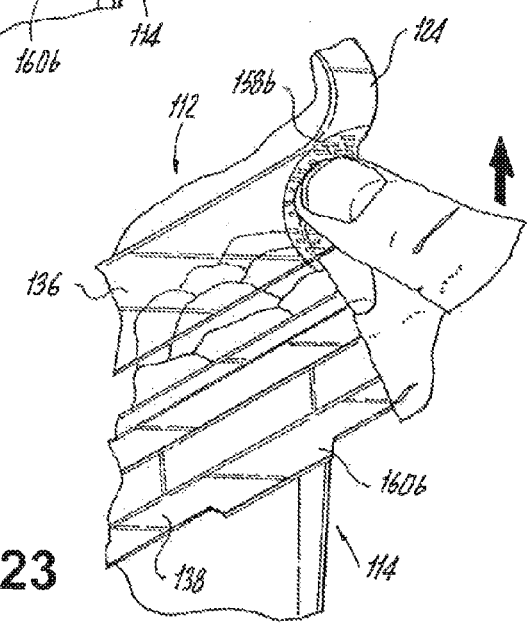

FIGS. 13-15 illustrate an exemplary configuration for a double scoring blade having blades 46a, 46b, which can be used in a punch press system or the like to form score lines 42a, 42b in accordance with one embodiment of the present invention. Various dimensions of blades 46a, 46b are also provided herein as a non-limiting example.

The lateral separation L1 between blades 46a, 46b is in this embodiment about 0.36 inches. The length L2 of blades 46a, 46b is about 2.25 inches. Blades 46a, 46b include an offset recessed portion 48 with a series of substantially similar nicks 50 cut therein between cutting edges 52. The width L3 of cutting edges 52 is preferably 0.36 inches. Preferably, the offset L4 between recessed portion 48 and cutting edges 52 is approximately 0.001 inches.

In this embodiment, blade 46a includes seven (7) nicks 50 while blade 46b includes eight (8) nicks 50. The nicks 50 on blade 46a are offset with respect to the nicks 50 on blade 46b, which results in a desirable zipper-like effect when removing strip 18. Preferably, nicks 50 are triangular shaped, about 0.010 inches deep and about 0.020 inches wide, and define an approximately 90 degree angle at its deepest convergence point 54. The length L5 between nicks 50, as measured between the respective convergence points 54 of adjacent nicks 50, is approximately 0.252 inches. The length L6 between the respective convergence points 54 of adjacent offset nicks 50 on blade 46b is about 0.126 inches. The length L7 of blades 46a, 46b is about 0.1 inches, and each blade edge defines an angle of about 45 degrees.

It should be readily understood that a container constructed in accordance with the present invention, which is preferably a plastic container used for carrying edible items, can be manufactured in a variety of shapes and sizes, and can be formed from resins or plastic materials such as polyethylene, polypropylene, polyvinyl chloride or polyethylene terephthalate ("PETE"), as well as other suitable materials or combinations thereof. The forming process can also vary to include methods such as thermo-forming, injection molding or blow molding. The container can be transparent or translucent, and may be colored in either instance. Also, vents can be provided in the container to promote airflow therethrough, if appropriate based on the intended contents of the container.

Preferably, container 10 is formed from a roll of PETE subjected to a vacuum and pressure mold with plug assist. During manufacture, blades 46a, 46b of FIGS. 13-15 are preferably applied to a newly formed container 10 to impart score lines 42a, 42b thereon. Cutting edges 52 cut substantially through the material used to make container 10. Preferably, the configuration of blades 46a, 46b are designed so that a desirable amount of force is necessary to remove strip 18, as determined by consumer trials for example. Those skilled in the art will readily appreciate that the configuration of blades 46a, 46b can be adjusted for a variety of reasons, and the above dimensions are exemplary of one embodiment of the present invention.

For example, various other methods can be employed to form frangible strip 18 of hinge 16. For example, score lines, nicks or penetrations can be created with the molding tool itself during the forming step. Alternatively, a high die forming process can be employed where, after the forming step, the container is indexed to a trim station, where one or more knives liberate the container and create the score lines or perforations. Also, an intermittent cutter can be employed between the forming step or the trim step, a progressive punch and die operation can be employed, or a numerically controlled laser can be employed to create the nicks. It is also envisioned that electro-mechanical, ultra-sonic or hydrodynamic systems can be employed in the forming process.

Container 10 could also be formed with locking arrangements known in the art other than the tamper-resistant/tamper-evident evident closure of the subject invention, such as traditional male and female locking features.

Referring to FIGS. 16-23, there is illustrated another tamper-resistant/tamper-evident evident container constructed in accordance with a preferred embodiment of the subject invention and designated generally by reference numeral 110. Container 110 is similar to container 10 described above except that container 110 is rectangular in configuration rather than circular. Container 110 thus includes a base portion 114 and a cover portion 112 joined together by an integrally formed hinge 116 that defines a tamper-evident frangible pull strip 118, which must be removed before cover portion 112 can be readily removed from base portion 114.

Container 110 includes embossed or raised patterned sections 156a and 156b on opposing tabs 144a and 144b of strip 118, respectively, to facilitate removal of strip 118. Patterned sections 158a and 158b are also disposed on opposing sides of upper arm 136 to facilitate separation of cover portion 112 from base portion 114. Instructional indicia can be imprinted on upper arm 136 between patterned sections 158a and 158b.

In this embodiment, score line 142b is situated on hinge 116 to define two tabs 160a and 160b which are connected with lower arm 138. Tabs 160a, 160b remain in place on hinge 116 until strip 118 is removed, as can be best viewed in FIGS. 21-23. Tabs 160a, 160b extend from lower arm 138 to further facilitate gripping lower arm 138 and separation of cover portion 112 from base portion 114.

Figure 24:
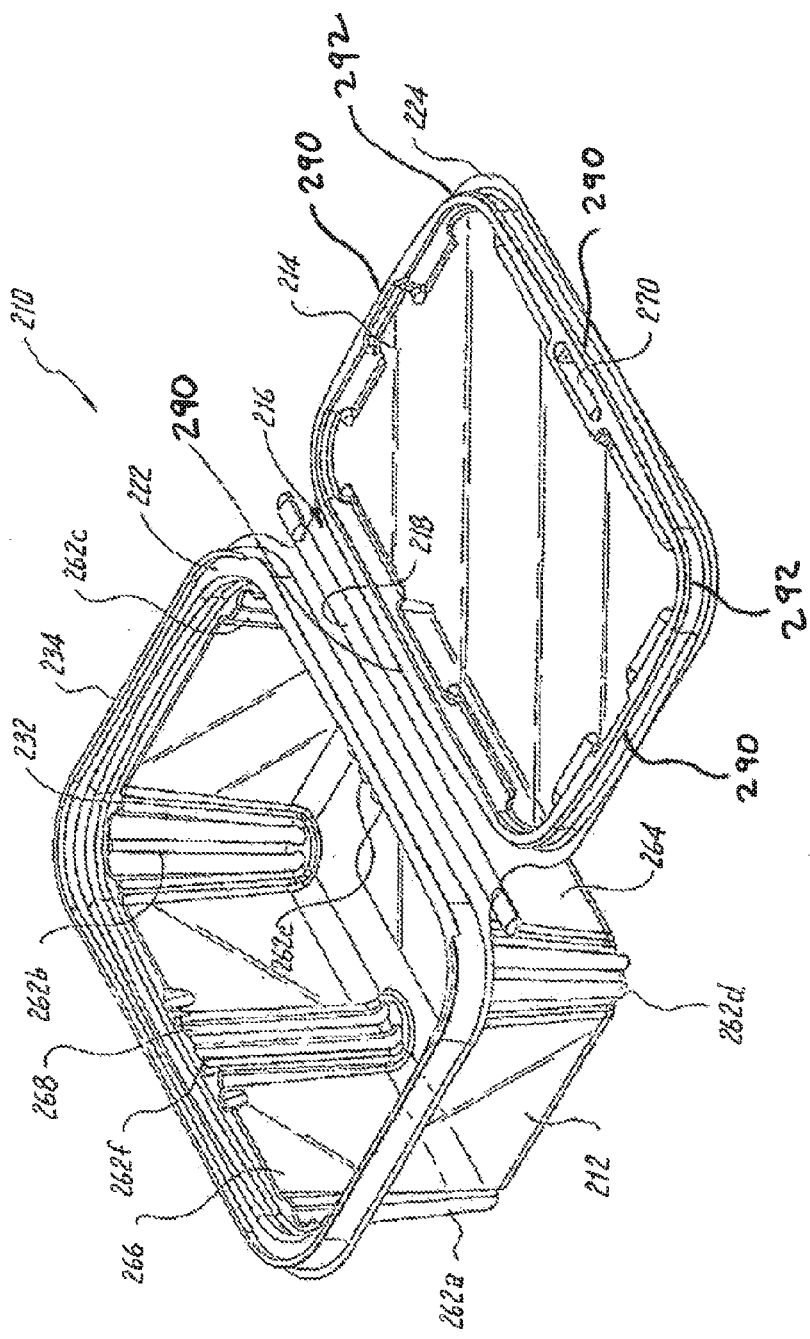
FIG. 24 is a perspective view of another embodiment of a tamper-resistant/tamper-evident container constructed in accordance with the present invention having an additional engagement mechanism and support structure for providing enhanced structural integrity and further securing the base portion and cover portion, among other things.
Figure 25:
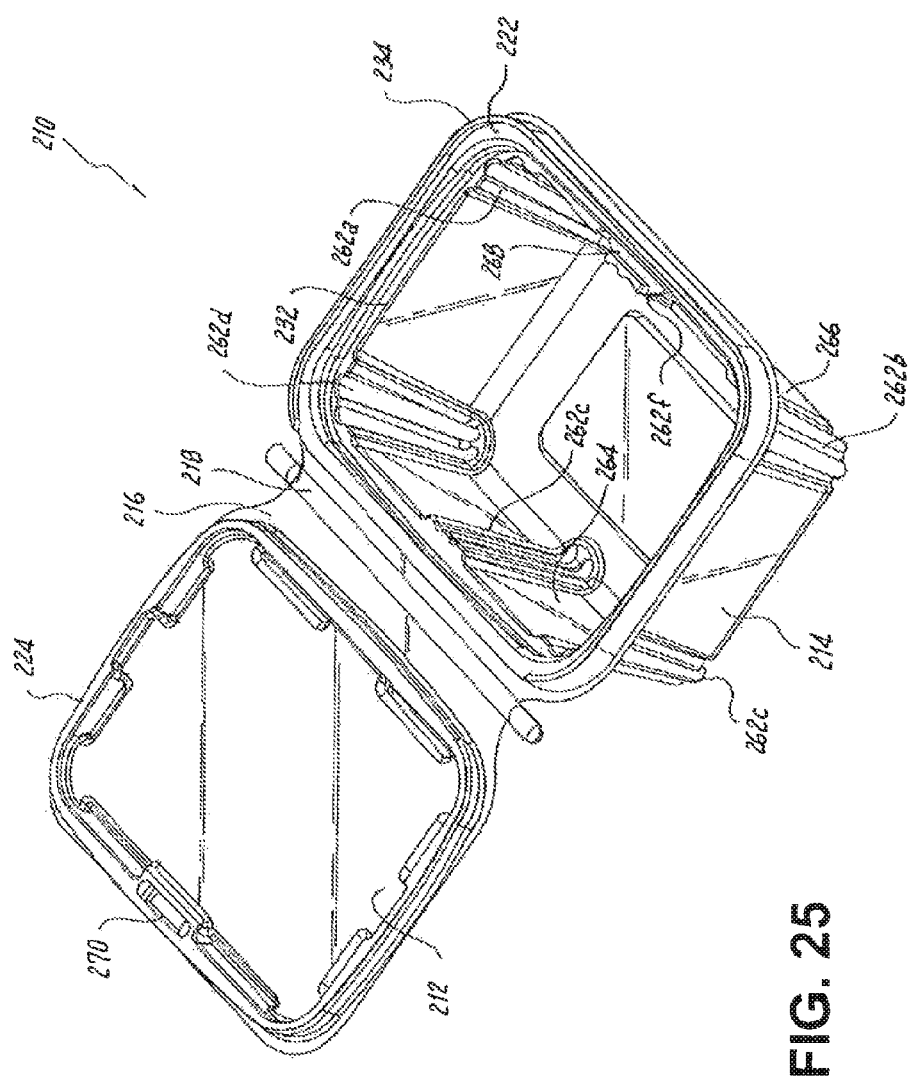
FIG. 25 is another perspective view of the tamper-resistant/tamper-evident container shown in FIG. 24.
Figure 26:
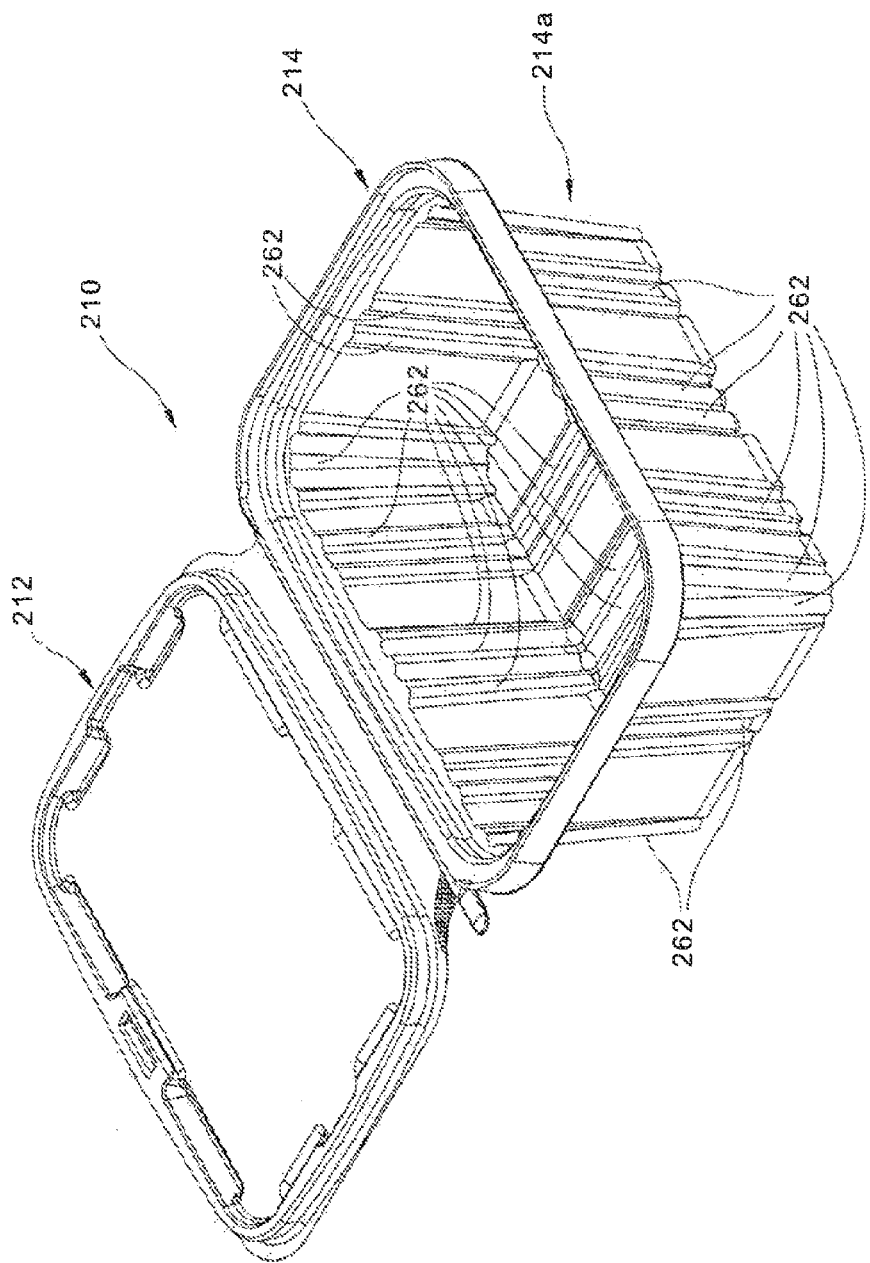
FIG. 26 is a perspective view of another embodiment of a tamper-resistant/tamper-evident evident container similar to that depicted in FIGS. 24-25, but including a further variation of a pattern of reinforcing ribs.

FIGS. 24-26 illustrate other tamper-resistant/tamper-evident evident containers constructed in accordance with a preferred embodiment of the subject invention and designated generally by reference numeral 210. Container 210 is rectangular in shape, but may be formed in other shapes, and has similar features to containers 10 and 110 described above. Container 210 includes, among other things, a base portion 214 and a cover portion 212 joined together by an integrally formed hinge 216 that defines a tamper-evident frangible pull strip 218, which must be removed before cover portion 212 can be readily removed from base portion 214. An upwardly projecting bead 234 is disposed on peripheral rim 222 of base portion 214. Bead 234 is positioned to substantially surround the outer edge of flange 224 of cover portion 212 when container 210 is closed, thus physically blocking access by fingers or any other object that could be applied to the edge of peripheral flange 224 and rim 222 for leverage while attempting to pry cover portion 212 from base portion 214.

In the embodiments of FIGS. 24-25 a plurality of supporting ribs 262a-f, each extending from about the enclosed bottom of base portion 214 to about extending rim 232 are positioned at the four corners (ribs 262a-d, respectively) of base portion 214 and the midpoints on hinge side wall 264 (rib 262e) and opposing side wall 266 (rib 262f) of base portion 214 to provide enhanced structural integrity. Supporting ribs 262a-f generally consist of multiple elongated, arcuate portions, each having a curved latitudinal cross-sectional profile, positioned adjacently with respect to one another.

In the embodiment disclosed in FIG. 26, a multiplicity of ribs 262 are provided distributed about the bottom of base portion 214 as well as about the peripheral wall 214a of base portion 214. Applicants have discovered that the disclosed arrangement of ribs 262 about base portion 214 provides particularly advantageous performance. Over two dozen containers were tested having various rib patterns. However, the container disclosed in FIG. 26 exhibited the most superior performance. By way of illustration only, the container depicted in FIGS. 24-25, without the rib pattern of the container in FIG. 26 may be made, for example, from a thermoformable material such as polyethylene terephthalate sheet in a thickness range from about 12 mils to about 40 mils, and preferably from about 14 mils to about 25 mils, depending on the size of the container. For example, it may be desirable to form a smaller container from a thinner gauge material than a larger container.

It has been discovered that the container depicted in FIG. 26 can be made from a substantially thinner gauge of sheet material than that depicted in FIG. 25. A 32 ounce container as depicted in FIG. 25 made of polyethylene terephthalate, for example, can be made from a 25 mil sheet. In contrast, an even stronger container as depicted in FIG. 26 can be made from a 22 mil sheet. It is further believed that such a container could be made of a 20 mil sheet of polyethylene terephtalate. This accordingly may result in a 20% material savings, which can result in significant cost reduction for making a container of a given size.

As further disclosed in these embodiments, a circumferential engagement sealing interface between cover portion 212 and base portion 214 is defined in part by a plurality of outwardly bowed arcuate portions 290. As depicted, outwardly bowed arcuate portions 290 are connected by rounded corner portions 292.

Container 210 may also include an additional independent, engaging mechanism that provides even further structural integrity, enhances security by urging flange 224 to remain in position against peripheral rim 222, and facilitates the reattachment of cover portion 212 to base portion 214, among other things. As depicted in FIGS. 24 and 25, for example, male engaging member 268 projects upwardly from supporting rib 262f on side wall 266 which is received by a correspondingly sized female engaging member 270 defined on cover portion 212.

Thus, when container 210 is closed, male engaging member 268 on base portion 214 and female engaging member 270 on cover portion 212 form an engagement which further secures base portion 214 to cover portion 212. In addition to urging flange 224 against rim 222, the aforementioned features increase the amount of force that would be necessary to pry cover portion 212 from base portion 214 in an unauthorized manner (i.e., without removal of strip 218).

Also, the aforementioned engagement facilitates the reattachment of cover portion 212 with base portion 214 after container 210 is opened legitimately by a consumer. Container 210 can be reclosed after purchase by urging cover portion 212 onto base portion 214, and in particular, this can be accomplished by pressing on the corners of cover portion 212, as indicated by instructional indicia printed in the outer corner areas of cover portion 212 in this embodiment. In reclosing container 210, the initial engagement of male member 268 with female member 270 facilitates the subsequent step of applying pressure on the corners of cover portion 212, making it easier to reattach cover portion 212 to base portion 214. It should be readily apparent to those skilled in the art that other engagement mechanisms, devices, engagements and container designs, and combinations thereof, could be incorporated in any embodiment in accordance with the present invention.

Figure 27:
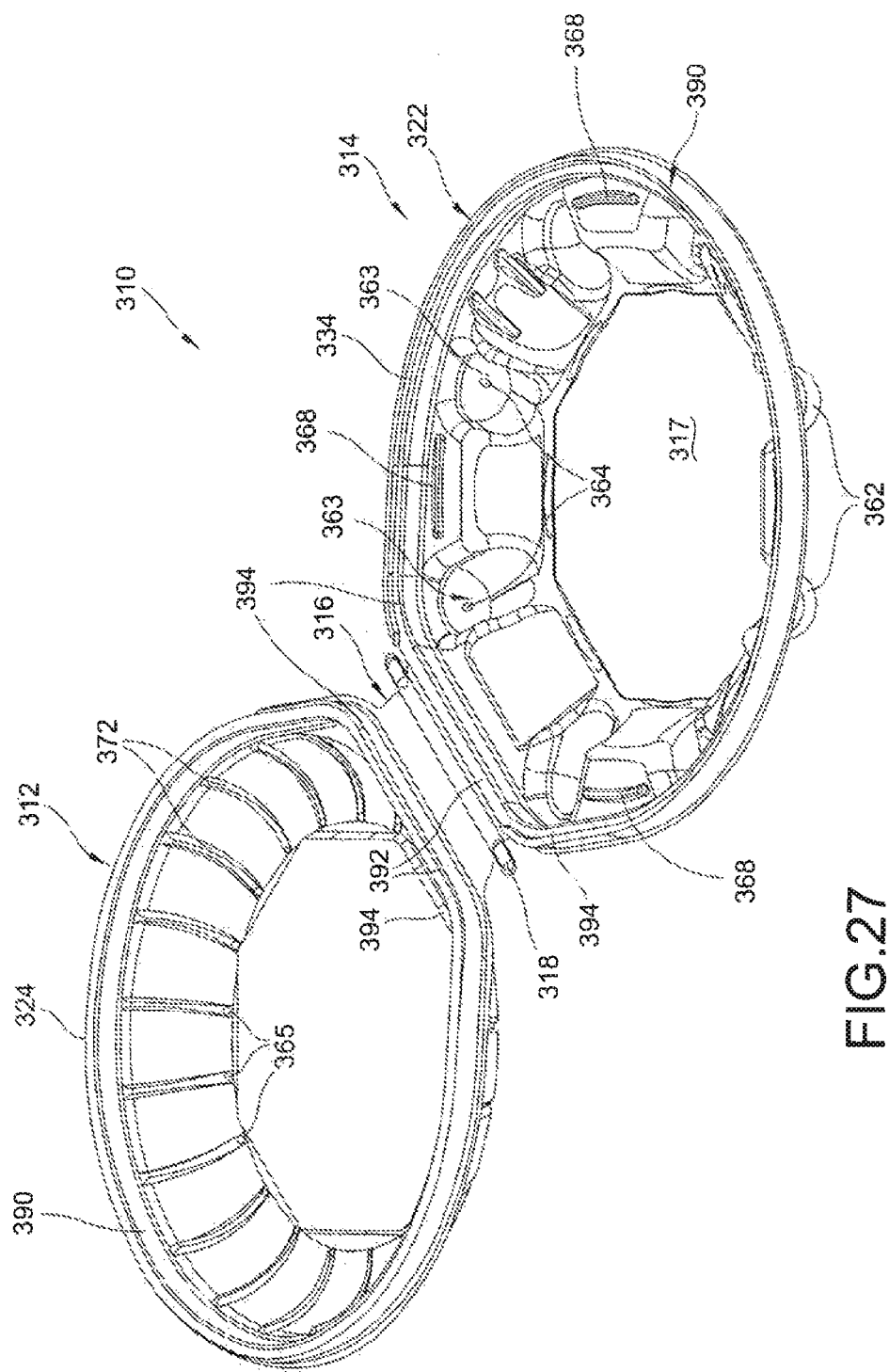
FIGS. 27-28 are perspective views of another embodiment of a tamper-resistant/tamper-evident evident container made in accordance with the invention.
Figure 28:
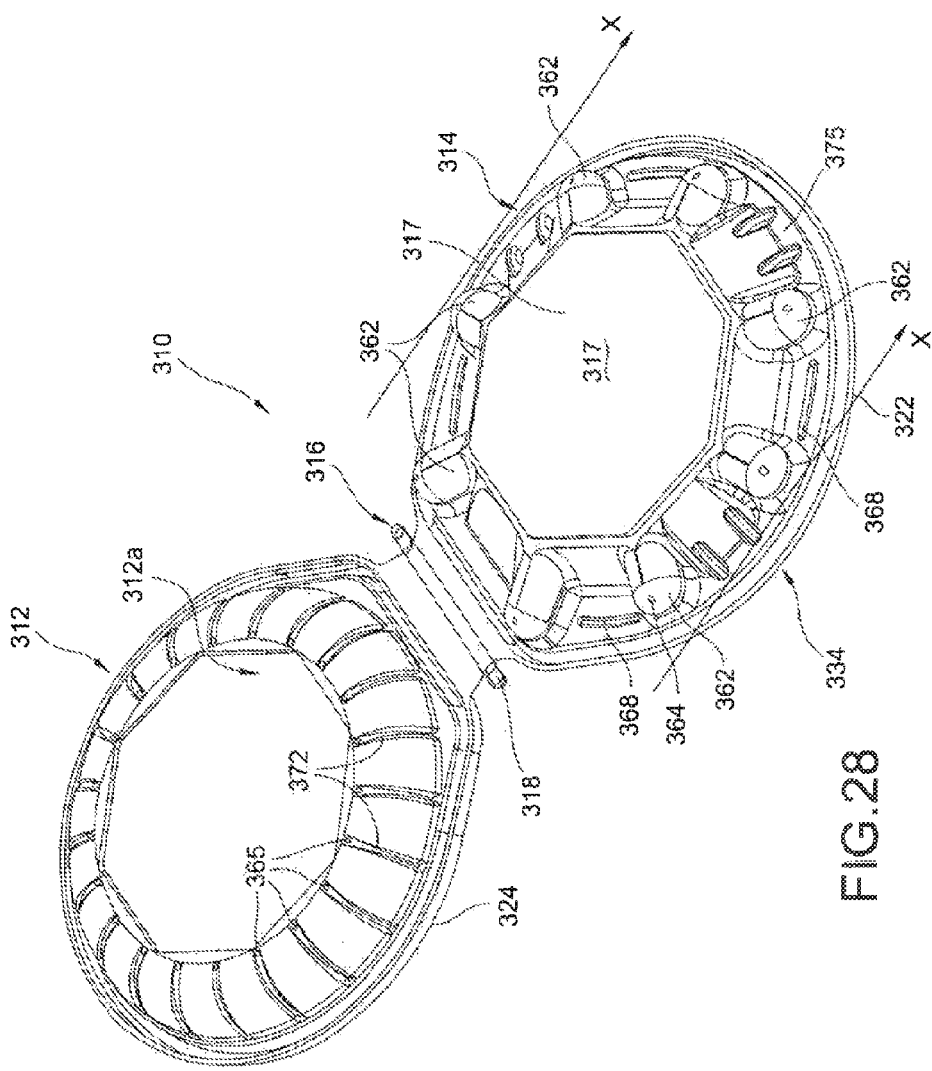

FIGS. 27-28 illustrate another tamper-resistant/tamper-evident evident container constructed in accordance with a preferred embodiment of the subject invention and designated generally by reference numeral 310. Container 310 is generally round in shape, but may be formed in other shapes, and has similar features to containers 10, 110 and 210 described above. Container 310 includes, among other things, a base portion 314 and a cover portion 312 joined together by an integrally formed hinge 316 that defines a tamper-evident frangible pull strip 318, which must be removed before cover portion 312 can be readily removed from base portion 314. An upwardly projecting bead 334 is disposed on peripheral rim 322 of base portion 314. Bead 334 is positioned to substantially surround the outer edge of flange 324 of cover portion 312 when container 310 is closed, thus physically blocking access by fingers or any other object that could be applied to the edge of peripheral flange 324 and rim 322 for leverage while attempting to pry cover portion 312 from base portion 314.

In this embodiment, a plurality of supporting gussets 362a-h, each extending from about the enclosed bottom of base portion 314 to about extending rim 332 are disposed proximate the eight corners of base portion 314 to provide enhanced structural integrity. Gussets 362 also define interior spaces 363 that can be used to facilitate fingers of a user to remove an object (such as a pie, for example) from container 310. Container 310 can also be provided with lower and upper vents 364, 365 respectively, disposed circumferentially proximate the top and bottom of the container 310 to facilitate defrosting or heating of the contents of container 310. In the case of a frozen pie, for example, warm air can be drawn in through upper vents 365. As air enters through upper vent 365, it is cooled, and sinks out through lower vent 364. If desired, vents 364 can be positioned proximate the lower portions of gussets 362, whereby each gusset can act as an air duct to facilitate transport of air through the container. It will be appreciated that vents 364, 365 can also operate to cool the contents of container 310, whereby relatively cool ambient air can be drawn in through lower ducts 364 and out of upper ducts 365, whereby the air is heated by the contents of the container to drive the flow. It will be appreciated that the location of vents 364, 365 can be varied, as desired. As depicted, vents 365 are disposed in welled recesses that form ribs 372 in cover portion 312 of container 310.

It was discovered through experimentation that it is desirable to have gussets 362 extend as close to the bottom 317 of base 314 as possible. This spreads out the load of the contents of container 310 over a larger area of containers 310 when containers 310 are stacked. It has also been discovered that it is desirable to have gussets 362 extend up to flange 375 to prevent flexure of container 310 to prevent flange 324 from being separated from bead 334. These design features significantly help make container 310 more tamper resistant by making container 310 more resistant to flexure.

As depicted, bottom 317 of base 314 is generally octagonal, and is adapted and configured to nest within the octagonal recess 312a formed in cover portion 312. The octagonal features permit directional stacking which can facilitate the alignment, transport, display and merchandizing of goods. It will be understood that other shapes besides octagonal can be used, as understood by those of skill in the art.

As depicted in FIG. 27, gussets 362 are adapted and configured so that gussets 362 can act as guides for guiding container between parallel rails (the locations of which being represented by axes X) of a guiding device to move, stack, fill and/or close containers 310, if desired.

As further disclosed in this embodiment, a circumferential engagement sealing interface between cover portion 312 and base portion 314 is defined in part by a rounded segment 390, a relatively straight segment 392 and two rounded corner portions 394. The shape of interface is adapted and configured to provide substantial resistance to ensure container 310 is relatively tamper resistant.

Container 310 also includes an additional independent, engaging mechanism that provides even further structural integrity, enhances security by urging flange 324 to remain in position against peripheral rim 322, and facilitates the reattachment of cover portion 312 to base portion 314, among other things. A plurality of male engaging members 368 project upwardly from base portion 314 disposed circumferentially about container 310. Male engaging members 368 actually cooperate to urge flange 324 against peripheral rim 322. This advantageously helps prevent tampering with the container. Members 368 also facilitate in guiding and aligning cover portion 312 with base portion to facilitate the reclosing of container 310 after it has been opened.

It will be understood that the cover portions 12, 112, 212 and 312 and base portions 14, 114, 214 and 314 can be made of different colored materials. For example, all or a part of the cover portions and/or base portions can be transparent while the rest of the container can be translucent or opaque. In accordance with one embodiment, two-tone sheeting is used (such as PETE) wherein a dark opaque material is mated adjacently to a transparent segment. The separation between the two sections can be routed in the machine direction of the thermoforming machine used to make the containers. The transition area from transparent to opaque can be aligned with the tamper evident strip of the container so that the cover portion can be a different color than (or transparent or translucent compared to) the base portion.

Although exemplary and preferred aspects and embodiments of the present invention and forming methods have been described with a full set of features, it is to be understood that the disclosed container and method of manufacture may be practiced successfully without the incorporation of each of those features. The scope of the present invention is not limited only to the tamper-resistant/tamper-evident evident containers and methods of manufacture disclosed herein. Thus, it is to be understood that modifications and variations may be utilized without departure from the spirit and scope of the invention and method disclosed herein, as those skilled in the art will readily understand. Such modifications and variations are considered to be within the purview and scope of the appended claims and their equivalents.

What is claimed is:

1. A method of thermoforming a tamper-resistant/tamper-evident container comprising:
    forming a cover portion from a portion of a single sheet of at least partially transparent plastic material, wherein the cover portion includes an outwardly extending peripheral flange;
    forming a base portion from a portion of the single sheet including an upper peripheral rim and a skirt depending downwardly therefrom, wherein, when the container is closed, the outwardly extending peripheral flange of the cover portion abuts the upper peripheral rim of the base portion and the upper peripheral rim of the base portion extends beyond an outer edge of the outwardly extending peripheral flange of the cover portion substantially about the perimeter of the container;
    forming a hinge from a portion of the single sheet joining the cover portion and the base portion such that the vertical height of the hinge correlates with the height of the skirt that depends downwardly from the base portion when the height of the skirt is substantially uniform around the perimeter of the container; and
    forming at least one line of weakness in the hinge, and wherein the at least one line of weakness is formed in a manner that the line of weakness is severed to facilitate removal of the cover portion from the base portion to open the container, wherein the cover portion, base portion, hinge and at least one line of weakness are formed from the single sheet of at least partially transparent plastic material.

2. The method of claim 1, wherein the single sheet of at least partially transparent plastic material is entirely transparent.

3. The method of claim 1, wherein the at least one line of weakness comprises two or more lines of weakness.

4. The method of claim 1, further comprising forming vents in the container to promote airflow therethrough.

5. The method of claim 1, wherein forming the base portion further comprises:
    forming an upwardly projecting bead in the upper peripheral rim, the upwardly projecting bead extending substantially about the perimeter of the container and configured to substantially surround an edge of the outwardly extending peripheral flange of the cover portion to hinder access to the container when the container is closed.

6. The method of claim 1, wherein the at least one line of weakness includes a plurality of lines of weakness that form a frangible tear strip in the hinge, and wherein, when the frangible tear strip is severed at least one projection is provided for facilitating removal of the cover portion from the base portion to open the container.

* * * * *